US008804581B2

(12) United States Patent
Tillman et al.

(10) Patent No.: US 8,804,581 B2
(45) Date of Patent: Aug. 12, 2014

(54) OFDMA SCHEDULING METHOD FOR AVOIDING LEAKAGE AT THE MOBILE STATIONS (75) Inventors: Fredrik Tillman, Lund (SE); Christian Bergljung, Lund (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 152 days.

(21) Appl. No.: 13/264,262

(22) PCT Filed: Apr. 8, 2010

(86) PCT No.: PCT/EP2010/054638
§ 371 (c)(1),
(2), (4) Date: Nov. 14, 2011

(87) PCT Pub. No.: WO2010/118983
PCT Pub. Date: Oct. 21, 2010

(65) Prior Publication Data
US 2012/0076056 A1    Mar. 29, 2012

Related U.S. Application Data (60) Provisional application No. 61/169,490, filed on Apr. 15, 2009.

(30) Foreign Application Priority Data

Apr. 15, 2009 (EP) ..................................... 09157916

(51) Int. Cl.
*H04J 1/00* (2006.01)
(52) U.S. Cl.
USPC ......................................................... 370/281

(58) Field of Classification Search
USPC ........ 370/230, 329, 296, 280, 252; 455/452.2
See application file for complete search history.

(56) References Cited

U.S. PATENT DOCUMENTS

| 5,917,809 A | 6/1999 | Ribner et al. |
| 6,240,077 B1 | 5/2001 | Vuong et al. |
| 2002/0188668 A1 | 12/2002 | Jeffery et al. |

(Continued)

FOREIGN PATENT DOCUMENTS

| CN | 1605220 A | 4/2005 |
| CN | 1714587 A | 12/2005 |

(Continued)

OTHER PUBLICATIONS

Figueiredo, D. et al., "Impact of Adjacent Channel Interference on the Capacity of Wcdmaifdd Networks", Proceedings of the 7th Conference on Wireless Personal Multimedia Communications (WPMC), 2004, pp. 1-5.

*Primary Examiner* — Yemane Mesfin
*Assistant Examiner* — Derrick V Rose
(74) *Attorney, Agent, or Firm* — Coats and Bennett PLLC (57) ABSTRACT

The present invention relates to scheduling of uplink and downlink resources between mobile terminals (110, 120) and a base station (130). To reduce the power leakage between the transmitter and the receiver of the mobile terminal (110), the scheduler allocates uplink frequency carriers and downlink frequency carriers with a large duplex distance to those mobile terminals (110, 120) that have to transmit with high power. This means that the requirements on the external SAW filter could be reduced.

10 Claims, 7 Drawing Sheets

(56) References Cited

U.S. PATENT DOCUMENTS

| | | |
|---|---|---|
| 2003/0109257 A1 | 6/2003 | Nilsson et al. |
| 2004/0208253 A1 | 10/2004 | Joo |
| 2006/0002323 A1 | 1/2006 | Hildebrand et al. |
| 2006/0009231 A1* | 1/2006 | Emami et al. ............... 455/452.2 |
| 2008/0025254 A1* | 1/2008 | Love et al. ................. 370/329 |
| 2008/0279125 A1 | 11/2008 | Hottinen |
| 2009/0135748 A1* | 5/2009 | Lindoff et al. ............... 370/296 |
| 2011/0075594 A1* | 3/2011 | Burstrom et al. ............. 370/280 |
| 2012/0044818 A1* | 2/2012 | Lindoff et al. ............... 370/252 |
| 2012/0075989 A1* | 3/2012 | Roessel et al. ............... 370/230 |

FOREIGN PATENT DOCUMENTS

| | | |
|---|---|---|
| CN | 1943141 A | 4/2007 |
| DE | 102005004152 A1 | 8/2006 |
| WO | 02/49385 A2 | 6/2002 |

* cited by examiner

OFDMA SCHEDULING METHOD FOR AVOIDING LEAKAGE AT THE MOBILE STATIONS

TECHNICAL FIELD

The invention relates to wireless communication systems and in particular to reducing interference by radio frequency (RF) transmitters on RF communication systems.

BACKGROUND

Figure 1:
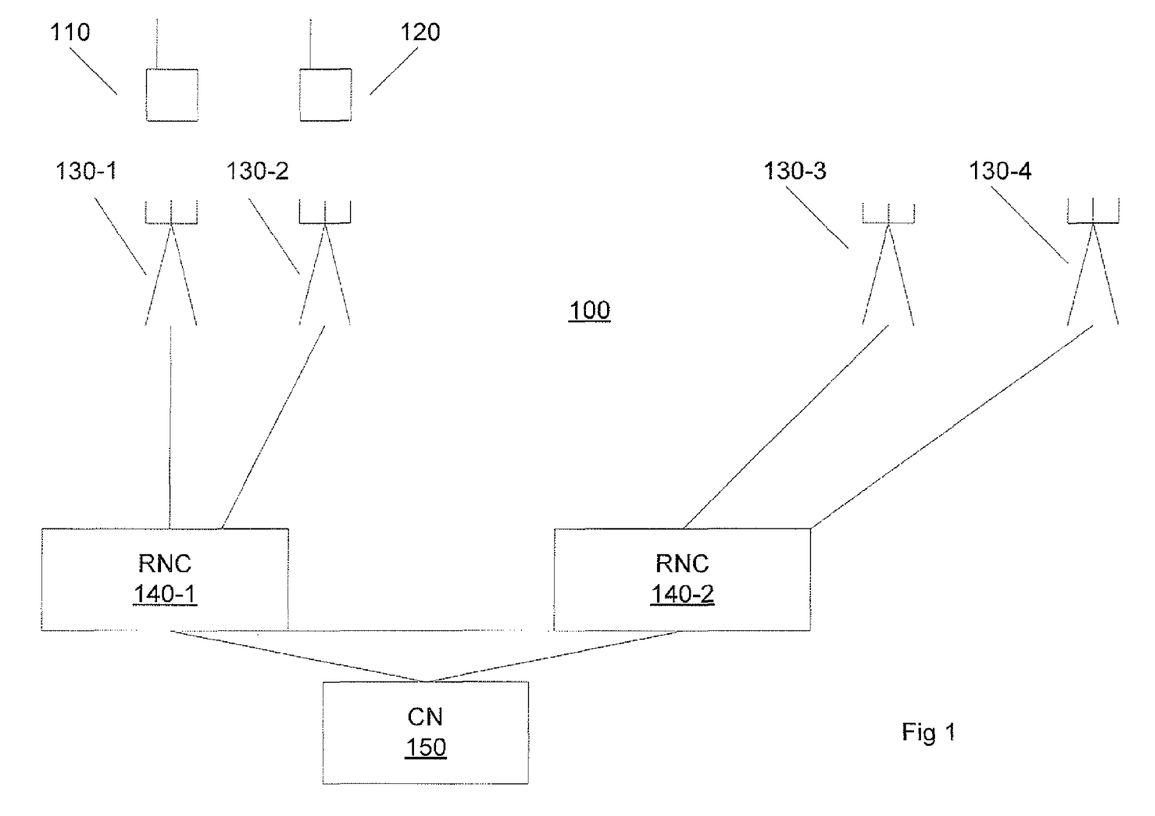
FIG. 1 shows an overview of a mobile communication system.

FIG. 1 shows an overview of a mobile communication system 100. The system comprises several mobile terminals 110, 120 connected to several base stations 130-1, 130-2, 130-3, 130-4. The mobile terminals 110, 120 could communicate with the base stations 130 using Frequency Division Multiplex (FDD) or Time Division Multiplex (TDD). FDD means that all communication from the mobile terminal 110, 120 to the base station 130 is transmitted on one frequency band, called the uplink frequency band, and all data communication from the base station 130 to the mobile terminal 110, 120 is transmitted on another frequency band, called the downlink frequency band. TDD means that all communication between the mobile terminal 110, 120 and the base station 130 uses the same frequency band for both the uplink and downlink communication. In this case the uplink and downlink communication is separated in time. If FDD is used the communication could be either Half Duplex or Full Duplex. Half Duplex means that the mobile terminal 110, 120 is not transmitting and receiving at the same time. In Full Duplex the mobile terminal 110, 120 and the base station 130 can receive and transmit at the same time.

The base stations 130 are connected to Radio Network Controllers (RNC) 140-1, 140-2, and the RNCs 140 are connected to a Core Network 150. In this application the RNC is defined as a node in the network that controls one or several base stations. This functionality can be included is the base stations or be a separate node in the network.

Figure 2:
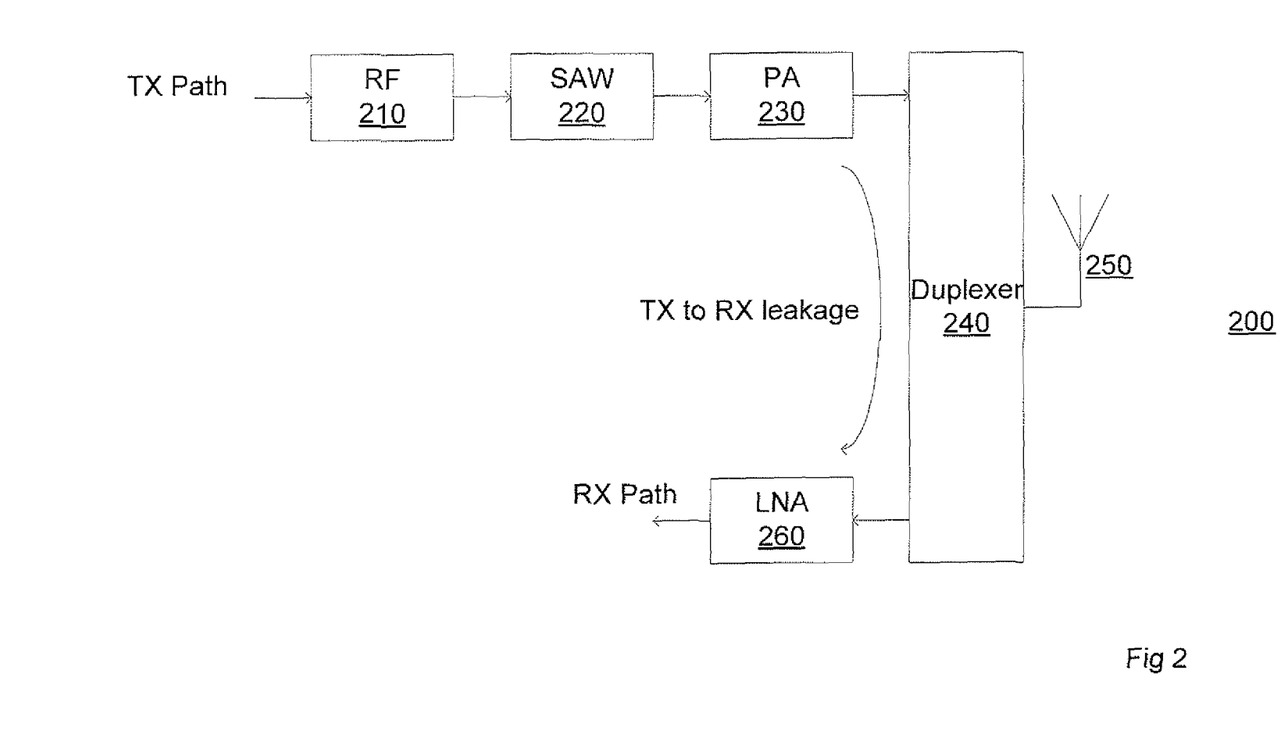
FIG. 2 shows part of a transceiver.

A scheduler for controlling the communication between the mobile terminal 110, 120 and the base station 130 is placed in the base station 130 or in the RNC 140, not shown in the figure. The scheduler determines where in the time- and frequency domains the mobile terminal 110, 120 and the base station 130 should transmit and receive its resources. Resources are in this context defined as the data or control information to be sent. Usually the scheduler does not allocate the whole frequency band to one user. The frequency band is divided in smaller parts called frequency carriers. In Global System for Mobile communication (GSM) one frequency carrier is 200 kHz and in Universal Mobile Telecommunication System (UMTS) one frequency carrier is 5 MHz. In Long Term Evolution (LTE) the smallest system bandwidth is 1.4 MHz and control signaling is spread over the entire system bandwidth (BW), but the smallest frequency carrier that can be allocated to one user is 180 kHz. In LTE this is called a resource block and consists of 12 sub carriers on 15 kHz BW each. The scheduler allocates both uplink frequency carriers and downlink frequency carriers. The distance between an uplink carrier and a downlink carrier allocated to one user is called the duplex distance FIG. 2 shows a part of a transceiver 200 according to prior art. The transceiver can be located in a mobile terminal 110, 120 or in a base station 130. When the mobile terminal 110, 120 or the base station 130 is transmitting the signal is transformed to Radio Frequency (RF) signal in the RF Application Specific Integrated Circuit (RF ASIC) 210. The signal is transformed to the frequency of the uplink frequency carrier that shall be transmitted over the air to the base station 130. Even if a majority of the signal energy is within the frequency carrier bandwidth, a small amount of energy will leak to the neighbor frequencies. To minimize this leakage, the leakage power is filtered by for example a Surface Acoustic Wave (SAW) filter 220. The power of the signal is amplified in the Power Amplifier (PA) 230 before being transmitted through the antenna 250 via the duplexer 240. The duplexer isolates the receiver (RX) from the transmitter (TX) in FDD-mode and consists basically of two SAW-filters. Normal TX to RX attenuation is 40-50 dB.

When the mobile terminal 110, 120 or the base station 130 is receiving, the signal is received at antenna 250 and forwarded to the Low Noise Amplifier (LNA) 260 via the duplexer 240.

Even if the uplink frequency carrier and the downlink frequency carriers are spaced apart by the duplex distance some energy will leak from the transmitter (TX) to the receiver (RX) and increase the noise in the receiver. A majority of this noise can be removed by filters such as SAW filter 220 but some energy will still leak to the receiver through the duplexer 240. The leakage from the transmitter to the receiver will increase with high transmit power.

Also, distortion caused by external interferers, the transmitted signal, and the receiver nonlinearities may position unwanted tones in the receive band and thus degrade the receiver signal-to-noise-ratio (SNR).

The problem with the existing solution is associated with cost. The external inter-stage SAW filter 220 is expensive, and concepts to avoid it may be power-hungry and difficult to implement. If the SAW filter is removed this will increase the linearity requirements on the transmitters especially at high power levels.

Another problem is that the number of external SAWs will increase with increased band-support, thus giving a big cost penalty for multiple-band transceivers.

SUMMARY

Embodiments of the present invention provide a method of scheduling which minimizes the power leakage from the transmitter to the receiver.

According to an embodiment of the invention the scheduler determines the transmit power of mobile terminals connected to a base station. This transmit power is the required transmit power that is needed for the mobile terminal to transmit its uplink resources. The scheduler the schedules the uplink and downlink recourses on frequency carriers such that the mobile terminal with the highest transmit power gets the largest duplex distance.

The transmit power of the mobile terminals may be determined by estimating the path loss between the mobile terminals and the base station.

Several uplink carriers and downlink carriers may be scheduled at the same time. In this case the minimum distance between any uplink carrier and any downlink carrier may be maximized.

The mobile terminal may send a message to the base station with information about its transmit power. This message can be sent on different control channels.

On some frequency bands a strong interferer such as a TV broadcast signal can be found on a neighboring frequency band. This interferer together with the uplink transmission may result in an inter modulation frequency. In some embodiments of the invention the uplink frequency carriers and downlink frequency carriers are scheduled such that the downlink frequency carrier does not overlap the said inter modulation frequency.

The inter modulation may be calculated according to $f_{UE\_RX}=2*f_{interferer}-f_{UE\_TX}$ or $f_{UE\_RX}=2*f_{UE\_TX}-f_{interferer}$, wherein $f_{UE\_RX}$ is the downlink frequency carrier for the mobile terminal, $f_{interferer}$ is the frequency of the neighboring interferer, and $f_{UE\_TX}$ is the uplink frequency carrier for the mobile terminal.

An advantage of the present invention is that the noise leakage from the transmitter to the receiver in the mobile terminal is lowered.

Methods according to embodiments of the present invention may lower the power consumption of the mobile terminal. Since embodiments of the invention may reduce the received noise level, less baseband resources can be allocated to advanced noise reduction and noise cancelling algorithms. This means that the average computation complexity of a receiver may be decreased, which in turn saves computational power and increases battery time. If the SAW filters can be avoided less space in the mobile terminal is occupied with filters.

BRIEF DESCRIPTION OF THE DRAWINGS

The invention will now be described more fully below with reference to the drawings, in which.

DETAILED DESCRIPTION

Figure 3:
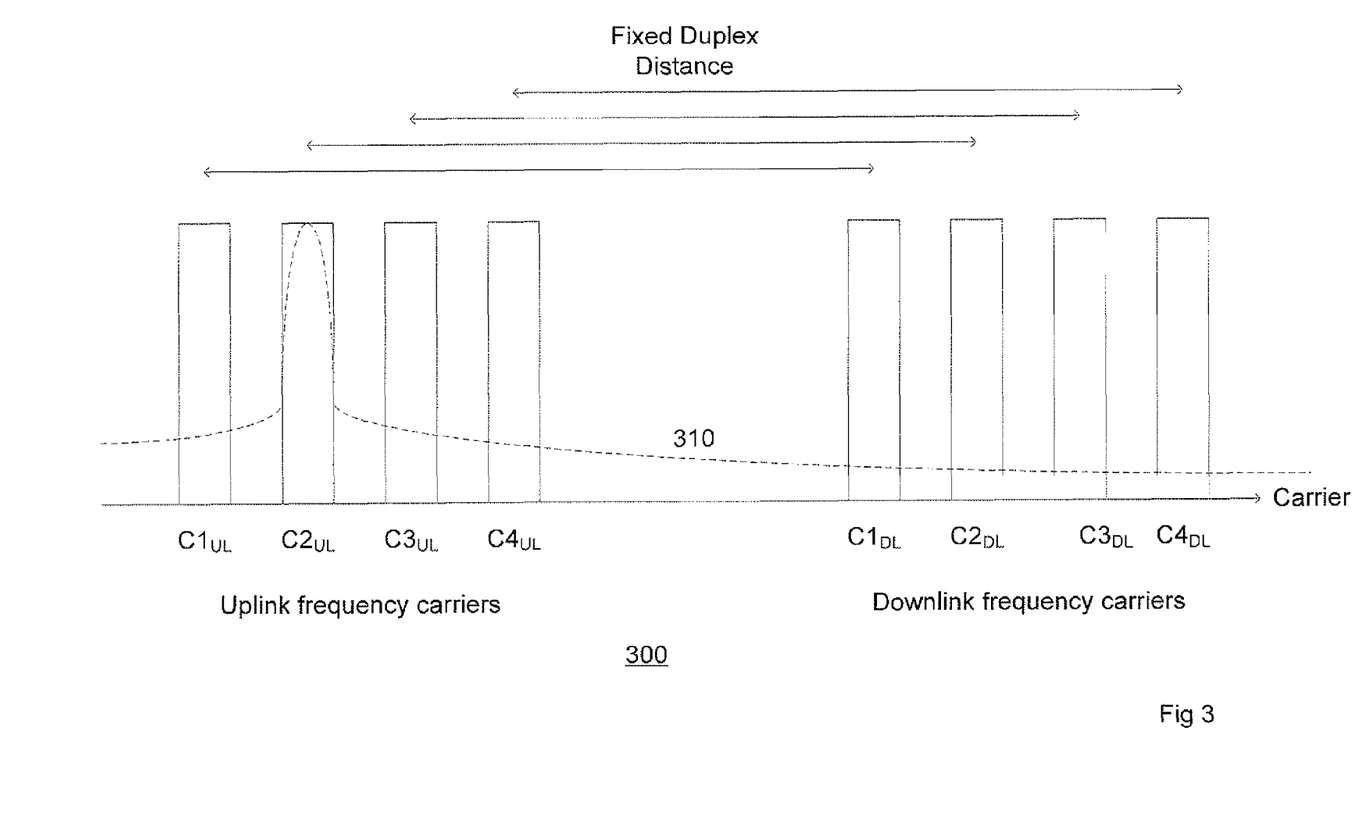
FIG. 3 shows how frequency carriers are allocated in a FDD system with a fixed duplex distance.

FIG. 3 shows a scheduling scheme 300. The scheduler allocates the uplink frequency carriers and downlink frequency carriers with a fixed duplex distance. The duplex distance is the distance (in Hz) between the uplink frequency carrier and the downlink frequency carrier. This means that if the mobile terminal 110, 120 uses frequency carrier $C2_{UL}$ for the uplink it uses frequency carrier $C2_{DL}$ for the downlink traffic.

In ideal circumstances the mobile terminal 110, 120 transmits all energy within its uplink frequency carrier. But under real circumstances some energy will leak 310 to the neighboring frequency carriers. The leakage is larger for the closest frequency carriers and decreases with the distance from the allocated frequency carrier.

In the future it is likely that mobile telecommunication will use the 700 MHz band. One such band could be UMTS band XII which uses the band 698-716 MHz for uplink traffic and 728-746 MHz for downlink traffic. If fixed duplex distance scheduling is used, this means that the duplex distance is just 30 MHz. On other frequency bands the duplex distance is larger. For instance the duplex distance for UMTS band I is 190 MHz.

The 700 MHz band is especially useful for large cells due to propagation reasons. If the mobile terminal 110, 120 transmits from the cell edge in a large cell to the base station 130, it must transmit with high power to be connected to the base station. Since the mobile terminal 110, 120 transmits with high power and the duplex distance is relatively small there is a risk that some energy will leak from the transmitter to the receiver of the mobile terminal.

Since the internal noise leakage between the transmitter and the receiver is large compared to other noise sources in the mobile terminal, the suppression of this noise is very important when designing non-expensive FDD transceivers without external filters, such as SAW filters.

As can be seen in FIG. 3, the noise power 310 decreases with the distance to the transmitted frequency carrier. If the duplex distance is small, the requirements on the internal filtering become prominent and costly. Intelligent scheduling of carriers used by terminals present in the system may relax the mobile terminal requirements, reducing the time spent in the worst scheduling case scenarios and thereby reduce the average power consumption of the terminals.

According to embodiments of the present invention the uplink and downlink resources are allocated on frequency carriers in such a manner that the leakage from the transmitter to the receiver in the mobile terminal is minimized, or at least reduced.

Figure 4:
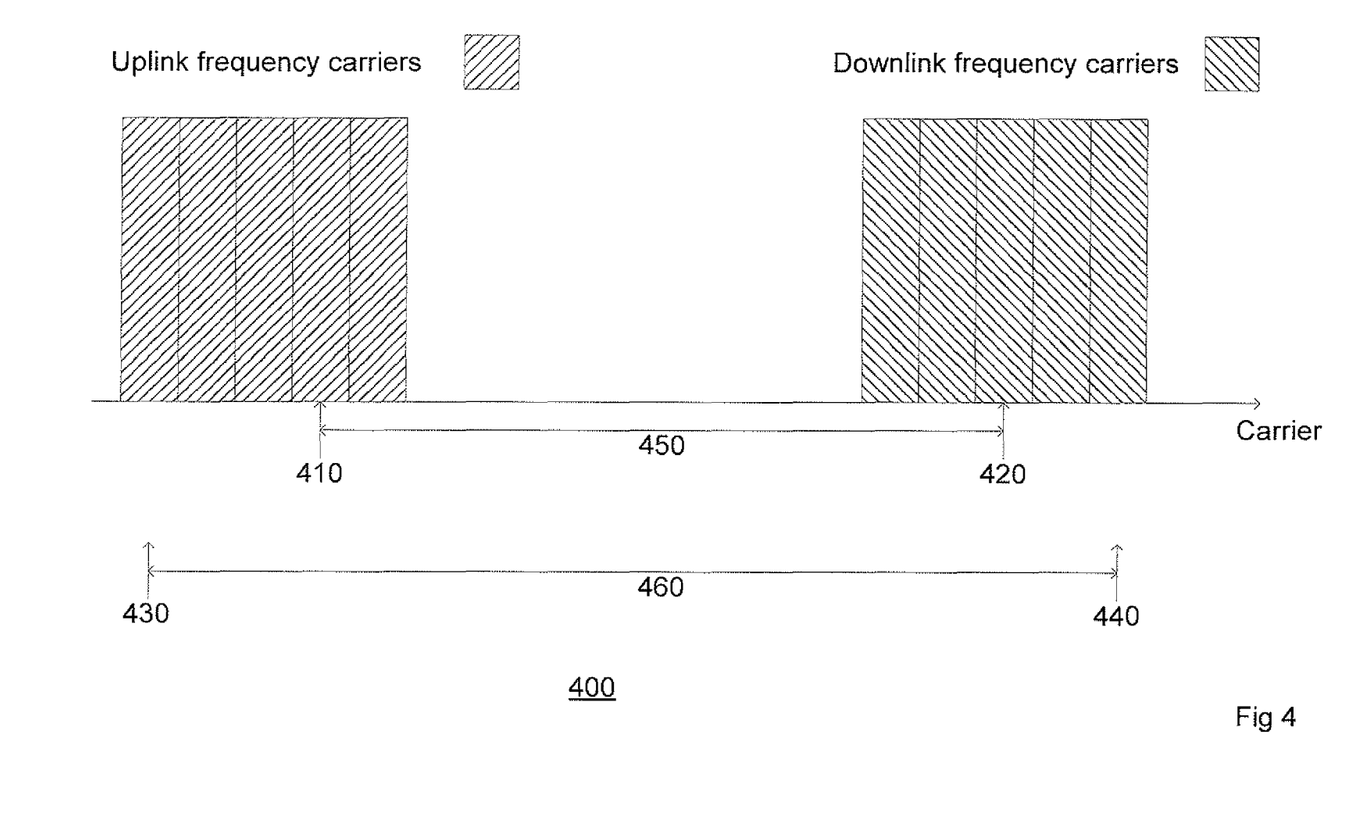
FIG. 4 shows how frequency carriers are allocated in a FDD system.

FIG. 4 shows a scheduling scheme 400 according to an embodiment of the invention. The scheduler allocates resources for two mobile terminals 110, 120 within the same cell. The first mobile terminal 110 is placed far away from the base station 130, and needs to transmit with high power. The second mobile terminal 120 is placed close to the base station 130 and can transmit with lower power and still maintain the connection to the base station 130. Since it is more likely that the first mobile terminal 110 will suffer from leakage from the transmitter to the receiver the scheduler allocates uplink frequency carriers 430 and downlink frequency carriers 440 with a large duplex distance denoted 460 to the first mobile terminal 110. If one mobile terminal is scheduled with a large duplex distance, other mobile terminals must be scheduled with a smaller duplex distance. The second mobile terminal 120 does not suffer so much from leakage from the transmitter to the receiver due to its lower transmit power which means that the scheduler can allocate uplink frequency carriers 410 and downlink frequency carriers 420 with a smaller duplex distance denoted 450 to the second terminal 120 compared to the duplex distance for first mobile terminal 110. If possible, the duplex distance should be maximized for all users but if the load of the system is high this may not be feasible. Then the mobile terminals transmitting with low power should be allowed to use a smaller duplex distance.

There are several ways for the scheduler to determine the transmit power of the mobile terminals. As a first example, the transmit power of a mobile terminal may be determined by estimating the path loss between the mobile terminal and the base station. The path loss can be determined from the Channel Quality Indicator (CQI) reports where the mobile terminal reports its channel quality to the base station. If the mobile terminal and the base station experiences bad channel quality, one way to compensate this is to transmit with a high power. This applies to both uplink traffic and downlink traffic. The transmit power of the mobile terminal may also be determined by studying the transmit power of the base station. The mobile terminal may also signal its transmit power to the base station. This information can be sent as an Radio Resource Control (RRC) message Further, historical information from the power control algorithms can be used to determine the transmit power of the mobile terminals.

Figure 5:
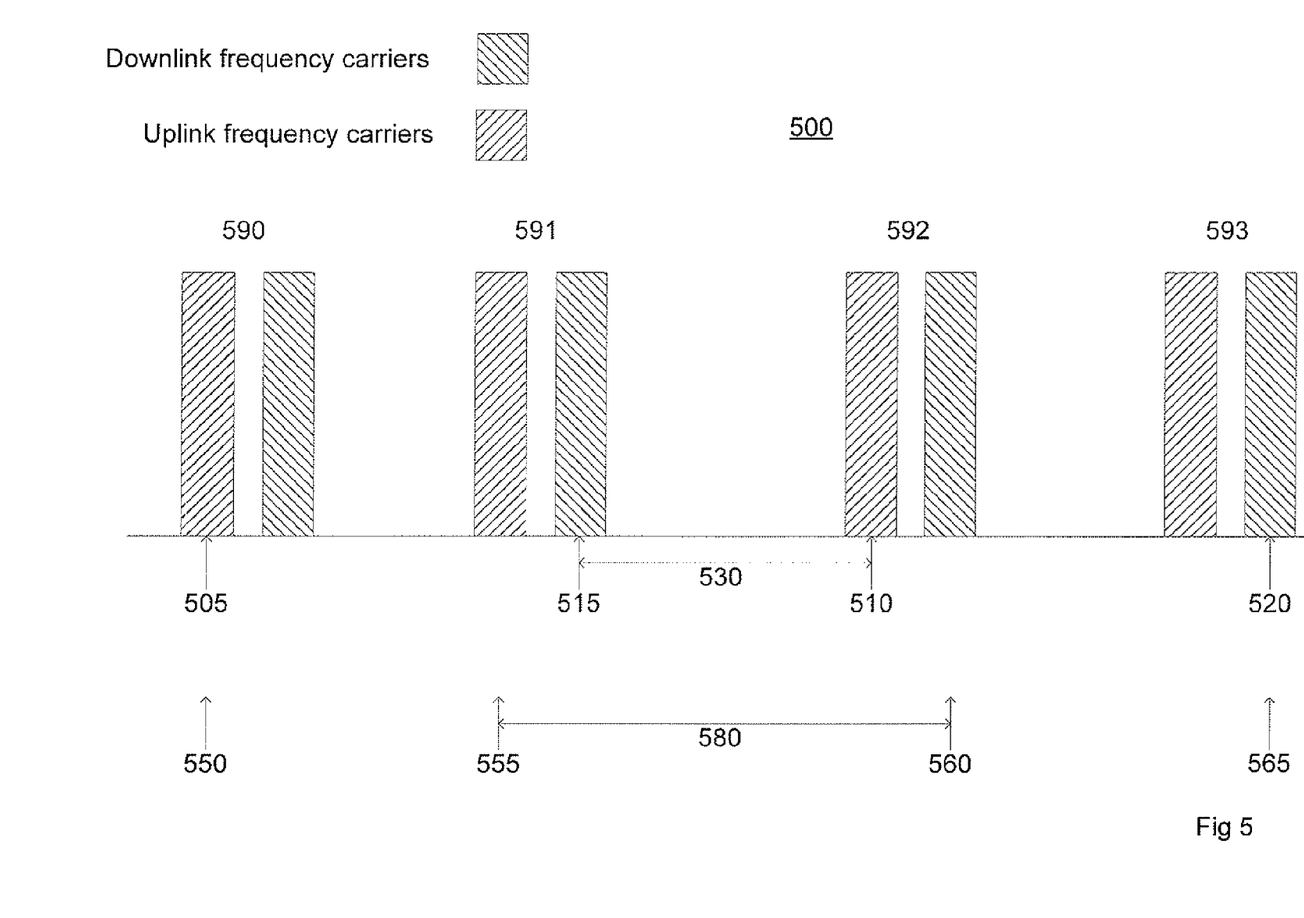
FIG. 5 shows how frequency carriers are allocated in a FDD system with aggregated spectrum.

In order to achieve large bandwidths in the future, e.g. for International Mobile Telecommunications (IMT)—Advanced standards or similar, combining frequency carriers in multiple frequency bands is a prerequisite. FIG. 5 shows a scheduling scheme 500 which applies to a situation when such an aggregated spectrum is used. Most mobile terminals can operate on several frequency bands 590, 591, 592, 593. The distance (in Hz) between the different frequency bands is usually larger than the duplex distance between the uplink carriers and the downlink carriers for the individual bands. In the aggregated spectrum case, the scheduler can allocate several uplink frequency carriers and several downlink frequency carriers simultaneously. The scheduler can allocate uplink frequency carriers 505, 510 and downlink frequency carriers 515, 520 to one user. In this case there are several duplex distances, i.e. between 505 and 515 or between 505 and 520. One option is to maximize the smallest duplex distance between any uplink frequency carrier and any downlink frequency carrier. Depending on the frequency band 590, 591, 592, 593 used, the smallest duplex distance could for example be the distance denoted 530 in FIG. 5. To maximize the minimum duplex distance frequency carriers 550 and 555 could be used for uplink traffic and 560 and 565 used for downlink traffic. This would mean that the minimum duplex distance is increased to the distance denoted 580 in FIG. 5.

It may be noted that it is not necessary that all frequency bands belong to the same base station. One scheduler can allocate uplink and downlink frequency carriers for several base stations.

Since the system never can guarantee larger duplex distance than the minimum requirement in the specification, all mobile terminals must be able to handle the minimum duplex distance, but on average, power savings are feasible if the average duplex distance is as large as possible.

Figure 6:
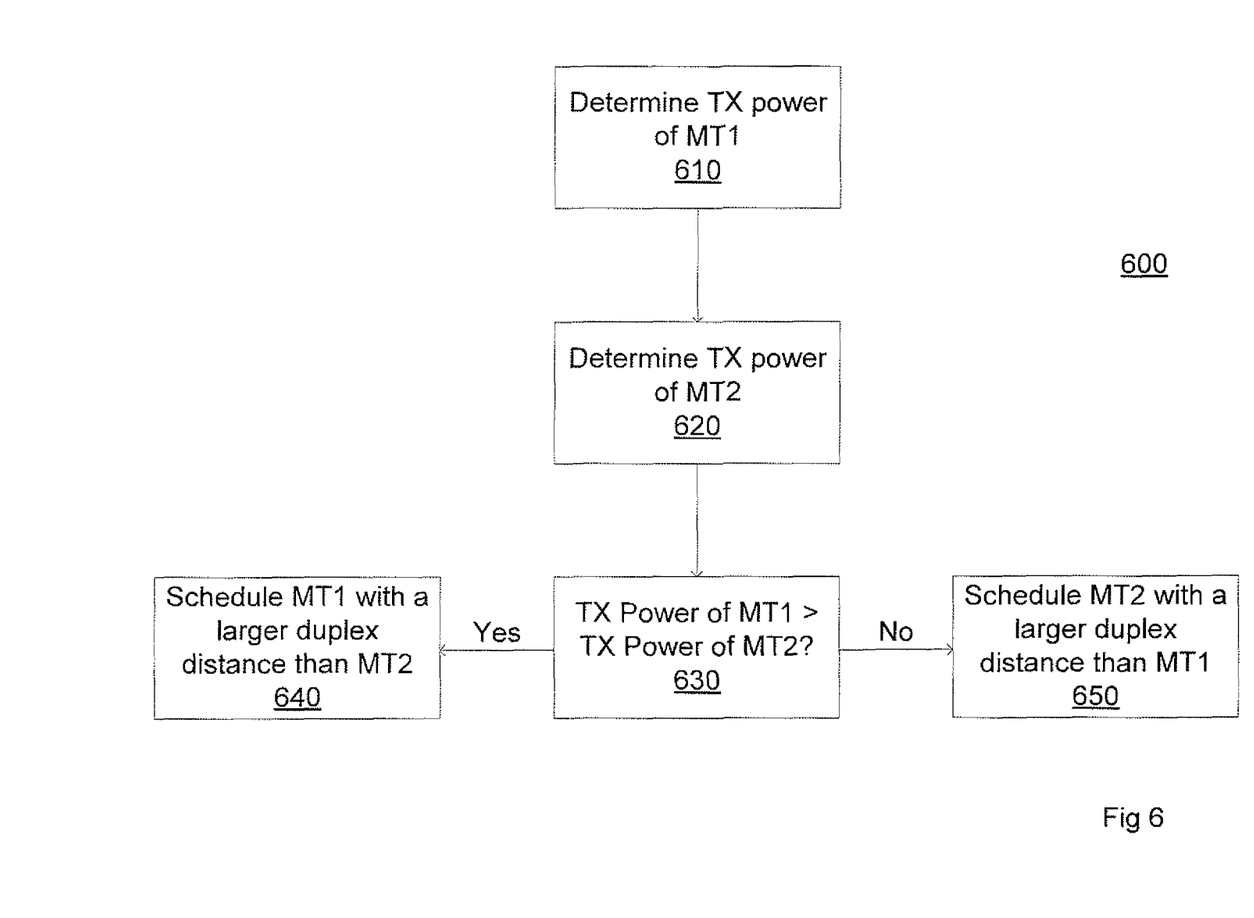
FIG. 6 illustrates a scheduling method.

FIG. 6 shows a flow chart 600 illustrating a scheduling method. In step 610 the scheduler determines the transmit power of the first mobile terminal 110 to transmit its uplink resources. This determination could be done according to any of the examples discussed above. In step 620 the scheduler determines the transmit power of the second mobile terminal 120 to transmit its uplink resources. In step 630 the scheduler determines if the first mobile terminal has a higher transmit power than the second mobile terminal. If the first mobile terminal 110 has a higher transmit power than the second mobile terminal 120 the scheduler allocates at least one uplink frequency carrier and at least one downlink frequency carrier in such a manner that the duplex distance of the first mobile terminal 110 is larger than the duplex distance of the second mobile terminal 120 in step 640. If the second mobile terminal 120 has a higher transmit power than the first mobile terminal 110 the scheduler allocates at least one uplink frequency carrier and at least one downlink frequency carrier in such a manner that the duplex distance of the second mobile terminal 120 is larger than the duplex distance of the first mobile terminal 110 in step 650.

On some frequency bands there might be a strong interferer on neighboring frequency. This could be a TV broadcast transmission, sent with a high power. This could be a problem, especially on the 700 MHz band since TV transmitters is found on neighbor frequencies. This could lead to an inter modulation frequency between an uplink frequency carrier and the neighboring interferer. If this inter modulation frequency should overlap a downlink frequency carrier in the mobile terminal, the noise in the mobile terminal would increase. Therefore it is favorable if a downlink frequency carrier is allocated to be outside the inter modulation frequency between the neighboring interferer and an uplink frequency carrier. The inter modulation frequency carrier could be calculated according to $$f_{UE\_RX} = 2 * f_{interferer} - f_{UE\_TX}$$

or $$f_{UE\_RX} = 2 * f_{UE\_TX} - f_{interferer}$$

where
$f_{UE\_RX}$ is the downlink frequency carrier
$f_{interferer}$ is the neighbor interferer
$f_{UE\_TX}$ is the uplink frequency carrier
The interfering signal $f_{interferer}$ is usually known to the scheduler.

Figure 7:
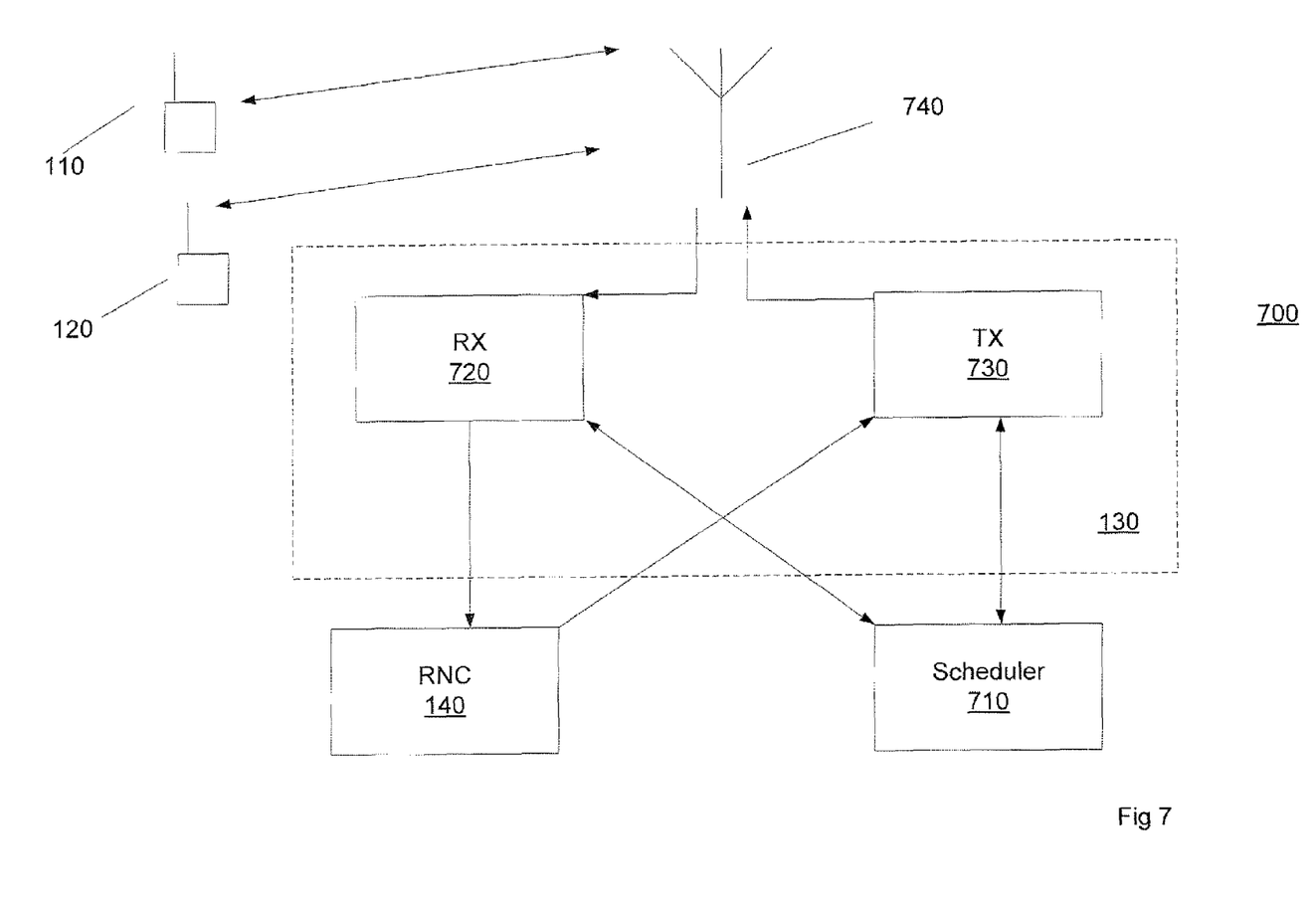
FIG. 7 shows a block diagram of a network including a scheduler.

FIG. 7 shows a block diagram 700 of a mobile communications network. A base station 130 is connected to several mobile terminals 110, 120. The base station 130 includes a receiver 720 for receiving information, a transmitter 730 for transmitting information and an antenna 740. The mobile terminals 110, 120 transmit information to the base station 130 via the antenna 740. This information is transferred via the base station receiver 720 to the RNC 140 and the rest of the network, not shown in the figure. Downlink data is transmitted to the mobile terminals via the transmitter 730 and the antenna 740. The receiver 720 and the transmitter 730 are also connected to a scheduler 710. The scheduler decides where in the time and frequency domain information between the base station 130 and the mobile terminals 110,120 shall be transmitted. If the scheduler 710 decides that uplink and downlink resources shall be scheduled with a duplex distance depending on the transmit power of the mobile terminal 110, 120, the scheduling is performed according to the method described above.

The invention claimed is:

1. A method of scheduling uplink and downlink resources on at least one uplink frequency carrier, and at least one downlink frequency carrier, separated by a duplex distance, for transmission between at least one base station and at least a first and a second mobile terminal, the method comprising:
   determining a transmit power of the first mobile terminal for transmitting its uplink resources;
   determining a transmit power of the second mobile terminal for transmitting its uplink resources;
   if the transmit power of the first mobile terminal is higher than the transmit power of the second mobile terminal, allocating the uplink and downlink resources to the mobile terminals so that the duplex distance of the first mobile terminal is larger than the duplex distance of the second mobile terminal;
   if the transmit power of the second mobile terminal is higher than the transmit power of the first mobile terminal, allocating the uplink and downlink resources to the mobile terminals so that the duplex distance of the second mobile terminal is larger than the duplex distance of the first mobile terminal;
   wherein, if uplink and downlink resources are simultaneously scheduled on more than one uplink frequency carrier and more than one downlink frequency carrier across multiple frequency bands, said allocating comprises allocating the uplink and downlink resources to the mobile terminals so that the minimum duplex distance of the first mobile terminal and the second mobile terminal is maximized;
   wherein the allocating comprises allocating the at least one downlink frequency carrier outside an inter modulation frequency between the at least one uplink carrier frequency and a neighboring interferer for each mobile terminal, such that the inter modulation frequency is calculated according to:

$$f_{UE\_RX} = 2*f_{interferer} - f_{UE\_TX} \text{ or } f_{UE\_RX} = 2*f_{UE\_TX} - f_{interferer}$$

where $f_{UE\_RX}$ is the downlink frequency carrier for the mobile terminal, $f_{interferer}$ is the frequency of the neighboring interferer, and $f_{UE\_TX}$ is the uplink frequency carrier for the mobile terminal.

2. The method according to claim 1, wherein determining the transmit powers of the mobile terminals comprises estimating the path loss between the mobile terminals and the base station.

3. The method according to claim 1, wherein determining the transmit powers of the first and second mobile terminals comprises receiving signaling from the mobile terminals that indicates their respective transmit powers.

4. The method according to claim 1, wherein the neighboring interferer is a high power transmission on an adjacent frequency band.

5. The method according to claim 4, wherein the high power transmission is a TV transmission.

6. A scheduler for scheduling uplink and downlink resources on at least one uplink frequency carrier, and at least one downlink frequency carrier, separated by a duplex distance, for transmission between at least one base station and at least a first and a second mobile terminal, wherein the scheduler is configured to:

determine a transmit power of the first mobile terminal for transmitting its uplink resources;

determine a transmit power of the second mobile terminal for transmitting its uplink resources;

if the transmit power of the first mobile terminal is higher than the transmit power of the second mobile terminal, allocate the uplink and downlink resources to the mobile terminals so that the duplex distance of the first mobile terminal is larger than the duplex distance of the second mobile terminal;

if the transmit power of the second mobile terminal is higher than the transmit power of the first mobile terminal, allocate the uplink and downlink resources to the mobile terminals so that the duplex distance of the second mobile terminal is larger than the duplex distance of the first mobile terminal;

wherein, if the scheduler simultaneously schedules uplink and downlink resources on more than one uplink frequency carrier and more than one downlink frequency carrier across multiple frequency bands, the scheduler is configured to allocate the uplink and downlink resources to the mobile terminals so that the minimum duplex distance of the first mobile terminal and the second mobile terminal is maximized;

wherein the scheduler is configured to allocate the at least one downlink frequency carrier outside an inter modulation frequency between the at least one uplink carrier frequency and a neighboring interferer for each mobile terminal, wherein the inter modulation frequency is calculated according to:

$$f_{UE\_RX} = 2*f_{interferer} - f_{UE\_TX} \text{ or } f_{UE\_RX} = 2*f_{UE\_TX} - f_{interferer}$$

where $f_{UE\_RX}$ is the downlink frequency carrier for the mobile terminal, $f_{interferer}$ is the frequency of the neighboring interferer, and $f_{UE\_TX}$ is the uplink frequency carrier for the mobile terminal.

7. The scheduler according to claim 6, wherein the scheduler is configured to determine the transmit powers of the mobile terminals by estimating the path loss between the mobile terminals and the base station.

8. The scheduler according to claim 6, wherein the neighboring interferer is a high power transmission on an adjacent frequency band.

9. The scheduler according to claim 8, wherein the high power transmission is a TV transmission.

10. The scheduler according to claim 6, wherein the scheduler is configured to determine the transmit powers of the mobile terminals by receiving signaling from the mobile terminals that indicates their respective transmit powers.

* * * * *

UNITED STATES PATENT AND TRADEMARK OFFICE
CERTIFICATE OF CORRECTION

PATENT NO. : 8,804,581 B2  
APPLICATION NO. : 13/264262  
DATED : August 12, 2014  
INVENTOR(S) : Tillman et al.

Page 1 of 1

It is certified that error appears in the above-identified patent and that said Letters Patent is hereby corrected as shown below:

On the Title Page, in item (56), under "OTHER PUBLICATIONS", in Column 2, Line 2, delete "Wcdmaifdd" and insert -- WCDMA/FDD --, therefor.

In the Specification  
In Column 3, Line 39, delete "scheduler;" and insert -- scheduler. --, therefor.

Signed and Sealed this  
Twenty-first Day of April, 2015

Michelle K. Lee  
*Director of the United States Patent and Trademark Office*